United States Patent [19]

Hubert

[11] Patent Number: 4,728,062
[45] Date of Patent: Mar. 1, 1988

[54] PIVOT ACTUATED NUTATION DAMPING FOR A DUAL-SPIN SPACECRAFT

[75] Inventor: Carl H. Hubert, Mercer County, N.J.

[73] Assignee: RCA Corporation, Princeton, N.J.

[21] Appl. No.: 797,127

[22] Filed: Nov. 12, 1985

[51] Int. Cl.$^4$ .............................................. B64G 1/38
[52] U.S. Cl. ..................................... 244/170; 244/165
[58] Field of Search ............. 244/170, 171, 164, 169, 244/165; 318/648, 649; 364/434

[56] References Cited

U.S. PATENT DOCUMENTS

| | | | |
|---|---|---|---|
| 3,591,108 | 7/1971 | Perkel | 244/165 |
| 3,638,883 | 2/1972 | Lanzaro | 244/1 |
| 3,685,770 | 8/1972 | Tomkin | 244/171 |
| 3,695,554 | 10/1972 | Phillips | 244/15 A |
| 3,830,447 | 8/1974 | Philips | 364/435 |
| 3,937,423 | 2/1976 | Johansen | 244/169 |
| 3,984,071 | 10/1976 | Fleming | 364/434 |
| 4,096,427 | 6/1978 | Rosen et al. | 318/648 |
| 4,193,570 | 3/1980 | Hoffman et al. | 244/165 |
| 4,272,045 | 6/1981 | Phillips | 244/170 |
| 4,370,716 | 1/1983 | Amieux | 364/434 |
| 4,386,750 | 6/1983 | Hoffman | 244/169 |
| 4,504,032 | 3/1985 | Phillips et al. | 244/170 |

OTHER PUBLICATIONS

AIAA Paper No. 70-456 of the 3rd Communications Satellite Systems Conference of Apr. 6-8, 1970; "Three Axis Attitude Control of a Synchronous Communications Satellite" by J. U. Beusch et al.

"Satellite Attitude Control with a Gimbaled Reaction Wheel Digital Control System" by C. H. Much et al., *Automatica*, vol. 8, pp. 9-21, Pergamon Press, 1972.

*Primary Examiner*—Joseph F. Peters, Jr.
*Assistant Examiner*—Lynn M. Fiorito
*Attorney, Agent, or Firm*—Clement A. Berard, Jr.; Robert L. Troike

[57] ABSTRACT

A nutation damping control for a dual-spin satellite is provided by tilting the axis of the rotor relative to the normal spin axis of the satellite and back a half nutation period later. The tilting is in the direction of the angular momentum vector component that is transverse to the rotor's spin axis.

8 Claims, 6 Drawing Figures

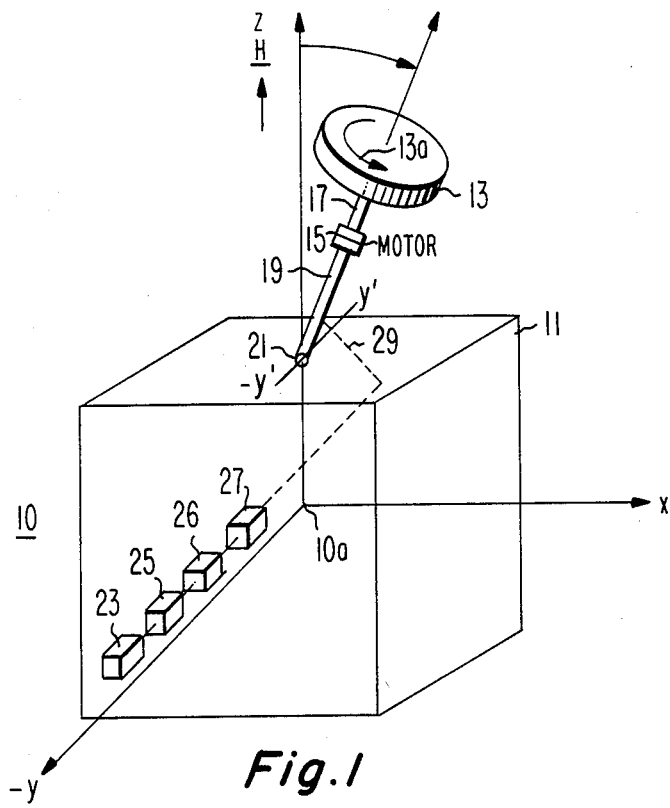
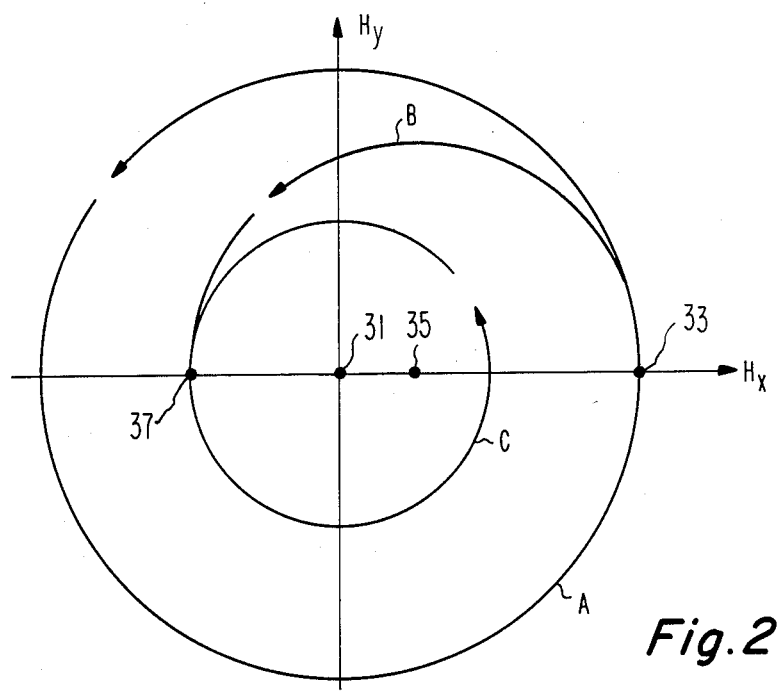
Fig.1
Fig.2

PIVOT ACTUATED NUTATION DAMPING FOR A DUAL-SPIN SPACECRAFT

This invention relates to orbiting spacecraft and, more particularly, to dual-spin spacecraft.

Dual-spin spacecraft have found wide use in communication satellites—particularly geosynchronous communication satellites. In such dual-spin spacecraft, a rotating body is coupled to a despun platform by a motor. One type of dual-spin spacecraft is sometimes referred to as a "momentum-biased spacecraft". In a momentum-biased, three-axis controlled spacecraft, the main body portion is a despun platform and the rotating body is a momentum wheel mounted to the platform. In another type of dual-spin spacecraft, sometimes referred to as a "spinner", the main body portion is a rotor whose spin provides the gyroscopic stability, like that of the momentum wheel, and the despun platform contains those components that have special pointing requirements (for example, antennas). Although the term "despun platform" is used for both cases, in geosynchronous orbit the motor generally rotates the platform one revolution per day so that the antenna always points toward earth. This pointing must be accurately maintained to keep the antenna axis pointing to the desired coverage area on earth. Changing the wheel speed or the rotor speed changes the relative rotation of the platform by the principle of conservation of angular momentum.

Dual-spin spacecraft exhibit certain types of troublesome motions called "wobble" or "nutation". These motions displace the satellite from its required attitude. Nutation is the coning of the rotor's nominal spin axis about the total angular momentum vector, and may result from any of the following disturbances: (1) upper stage booster nutation, (2) operation of the equipment that separates the spacecraft from the upper stage, (3) operation of thrusters, (4) bombardment by micrometeoroids and (5) operation of payload components with uncompensated momentum.

How a satellite's control system responds to nutational motions depends on whether the nutation is stable or unstable. In certain systems, and under certain conditions, nutation can increase after the original disturbance torque has been removed. In an undamped, uncontrolled system, nutational motions can continue without increasing or decreasing. When nutation decreases, it is said to be damped.

It is conventionally accepted that nutational stability is critically dependent on various parameters of a spacecraft including the moments of inertia, products of inertia, angular momentum, and the servo system that controls the rotations of the spinning rotor and the platform. In conventional design procedures nutation may be reduced by passive energy absorbing devices or active momentum transfer devices operable on either or both of the axes transverse to the rotor's spin axis.

Active dampers suppress nutation by developing a torque opposite to the component of the angular momentum vector that is perpendicular to the rotor's spin axis. Such active dampers may apply torques by firing propulsion jets or spinning wheels in addition to the stabilizing wheel of the despun system such as disclosed in U.S. Pat. No. 3,591,108 issued July 6, 1971 by Perkel and Comerford (assigned to the same assignee as the present invention). Active dampers have been provided by changing the speed of the momentum wheels as per U.S. Pat. No. 3,695,554 issued Oct. 3, 1972 by K. Phillips (assigned to the same assignee as the present invention) or U.S. Pat. No. 3,830,447 issued Aug. 20, 1974 by K. Phillips (assigned to the same assignee as the present invention). In the latter two cases, active damping is achieved by modulating the angular velocity of the wheel or rotor and using a product of inertia to couple the motor torque onto an axis perpendicular to the rotor axis.

It is desirable to find another approach to nutation damping that does not depend on changing the velocity of the wheel because changing the wheel velocity changes the rotation of the despun platform. It is also desirable to find a system that can rapidly damp large amplitude nutation and that also has some means for providing fine control when the nutation is small.

A nutation damper using a momentum wheel in a single degree of freedom gimbal is described in AIAA Paper No. 70-456 of the AIAA 3rd Communication Satellite Systems Conference of Apr. 6-8, 1970 entitled "Three Axis Attitude Control of a Synchronous Communication Satellite" by J. U. Beusch et al. A paper entitled "Satellite Attitude Control with Gimbaled Reaction Wheel Digital Control System" by C. H. Much et al. (by two of the members of the et al. group in the first paper) described the same system in Automatica, Vol. 8, pp. 9-21, Pergamon Press 1972. To form the gimbal, the momentum wheel housing is supported by two flexure pivots that are perpendicular to the wheel's spin axis and parallel to the satellite's roll axis. Mounted on the gimbal shaft are a position sensor, a rate sensor, and a torquer. The position sensor is a rotary variable differential transformer. The rate sensor is a brushless d.c. tachometer. The torquer is also a brushless device. Nutation of the satellite body causes the gimbal angle to oscillate. By driving the torquer in opposition to the gimbal motion, the nutational motion can be damped out. In the damping mode the torquer input signal is dominated by rate feedback from the gimbal tachometer. This creates a viscous damping effect between the satellite body and the wheel housing. This damper uses a drive motor and behaves like a viscous damper. It senses the motion of the wheel relative to the platform and torques the continuous drive motor proportional to the relative rate. This will provide damping, but like its equivalent is slow and requires separate sensing equipment. It is desirable to provide an active damper that rapidly damps nutation within one or two nutation cycles, that uses standard sensors to sense the motion of the platform relative to inertial space, and that returns the wheel axis to its nominal orientation relative to the platform.

SUMMARY OF THE INVENTION

According to one embodiment of the present invention an active nutation damper system is provided for a dual-spin satellite having a spinning body portion and a platform portion wherein the spinning body portion is joined to the platform portion by a pivot. The pivot axis is perpendicular to the spinning body's spin axis. The lateral angular motion of the platform body is sensed. A drive motor in response to the sensed lateral angular motion pivots the spinning body relative to the platform a given amount in one direction, and a half nutation period later pivots the spinning body back the same given amount to produce nutation damping.

BRIEF DESCRIPTION OF THE DRAWINGS

In the drawing:

FIG. 1 is a diagram in perspective of a spacecraft showing the three axes thereof and a pivoted momentum wheel according to one embodiment of the present invention;

FIG. 2 is a plot of the transverse angular momentum history resulting from a pair of wheel pivot pulses;

DESCRIPTION OF THE PREFERRED EMBODIMENT

Figure 3:
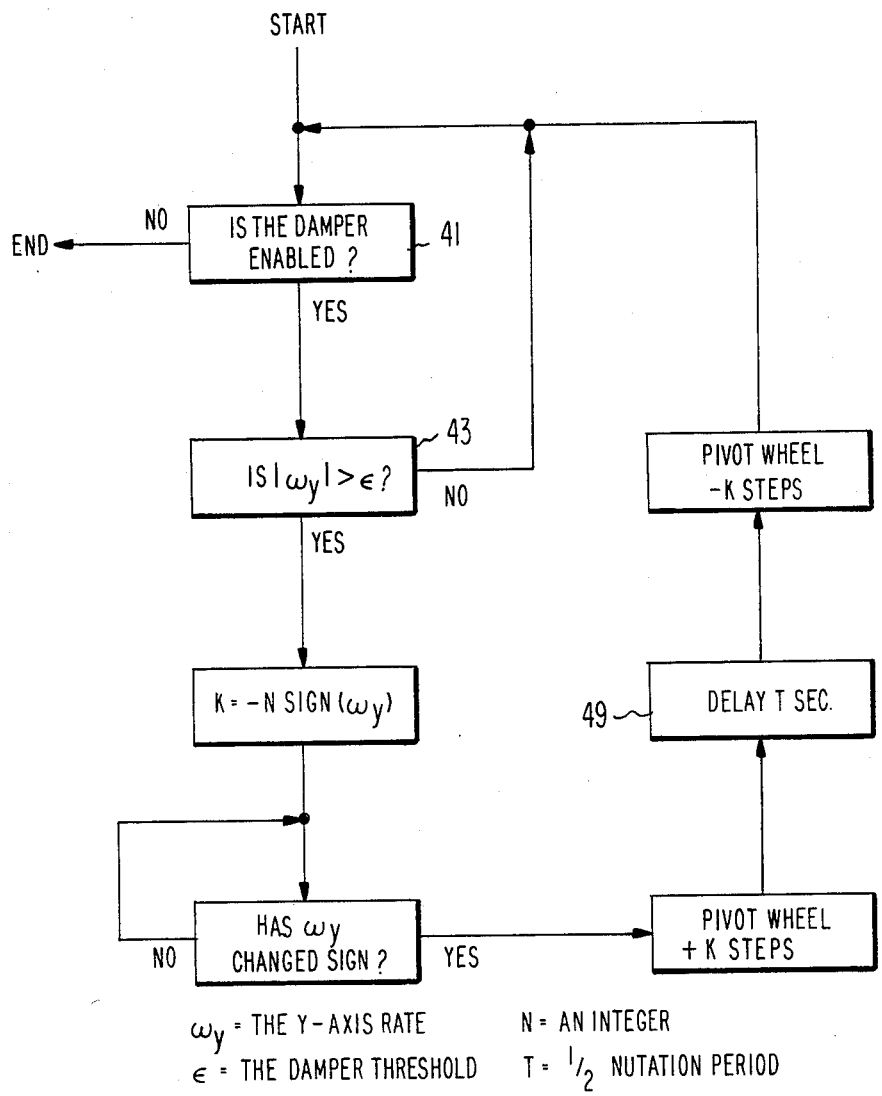
FIG. 3 is a representative logic diagram for the microprocessor of the damper in FIG. 1 according to one embodiment.

FIG. 1 illustrates spacecraft 10 having principal axes X, Y and Z. These mutually perpendicular spacecraft axes extend from the center of mass at 10a. Axis Z is defined to be the spacecraft axis that is colinear with the total angular momentum vector H when the spacecraft is operating in its intended mission. The X, Y, and Z axes form an orthogonal right-handed coordinate system that is fixed in the body of the spacecraft. A momentum wheel or rotor 13 is initially aligned so that its angular momentum vector is approximately parallel to the Z axis. A motor 15 couples the relatively non-spinning platform or body 11, which may contain an antenna, and the spinning momentum wheel 13. The motor 15 speed is controlled so that the momentum of the wheel 13 is sufficient to provide gyroscopic stiffness to the satellite 10. The motor speed is also controlled to maintain the body or platform 11 with the antenna on one face pointing to earth. As such, in a geosynchronous orbit, the platform rotates once per day. This control is provided by a pitch loop control system as described, for example, by Kevin Phillips U.S. Pat. Nos. 3,695,554 and 3,830,447 incorporated herein by reference.

In accordance with the teachings of the present invention the momentum wheel, which is initially aligned with its angular momentum vector approximately parallel to the Z axis, is pivoted with a hinge mechanism parallel to the Y axis to allow the wheel's angular momentum vector to be moved within the plane defined by the X and Z axes.

In accordance with the embodiment of the present invention in FIG. 1, the wheel 13 is mounted on rotor shaft 17 to motor 15 and via another shaft 19 from motor 15 to a hinge 21. Hinge 21 lies on the Y' axis, which is parallel to the Y axis. A gyro sensor 23 is aligned with its sense axis parallel to the Y axis. This sensor 23 senses the angular rate of the platform about the Y axis until its magnitude exceeds the damper threshold as detected by threshold detector 25. The output signal from the threshold detector is processed by microprocessor 26 which controls a stepper motor 27. The stepper motor 27 is coupled by mechanical linkage (represented by dashed lines 29) to shaft 19 to move the shaft about hinge 21 on the Y' axis.

When the Y axis angular rate crosses zero, as detected at the sensor 23, the stepper motor 27 coupled between the body 11 and the arm 19 rotates the axis of the momentum wheel 13 relative to the Z axis of the platform 11 in steps about the Y' axis. If the direction of the nutation is in the same direction represented by arrow 13a of the wheel, then, if the zero crossing is from negative to positive, the motor pivots the wheel in N steps in the Y' direction. If, however, the sign changes from positive to negative, then the wheel is pivoted in N steps about the −Y' direction. One-half nutation period after the first of the N steps, the wheel is pivoted N steps in the opposite direction. The wheel is thus returned to its original position. This back and forth pivoting is repeated until the nutation is reduced to an acceptable level.

If the nutation is retrograde, namely: the direction of the wheel's spin is opposite that of the direction of nutation, damping is achieved by reversing the directions of the pivot motions. That is, if the zero crossing is from negative to positive, then the wheel pivots N steps about the −Y' direction, and, if the sign changes from positive to negative, then the wheel pivots N steps about the +Y' direction. Similarly, one-half nutation period after the first of the N steps, the wheel is pivoted N steps in the opposite direction.

FIG. 2 illustrates the dynamics of the system. This diagram shows the trajectory of the spacecraft's total angular momentum vector projected on the platform-fixed XY plane. For simplicity it is assumed that the spacecraft is inertially symmetric about the Z axis. The wheel is normally aligned with the +Z axis. The normal trajectory, with no nutation, is simply the equilibrium point 31. During nutation however, the projection of the momentum vector follows a circular path, A, centered on point 31. For nutation in the same direction as the wheel's spin, the motion is counterclockwise as shown in FIG. 1. When the Y axis sensor rate crosses from negative to positive at point 33, the system pivots the wheel about the +Y axis. Moving the momentum wheel causes the equilibrium point to move from point 31 to point 35 and the total angular momentum vector now follows the circular path B centered on point 35. This occurs due to the principle of conservation of angular momentum.

Half a nutation cycle later, when the momentum vector reaches point 37, the wheel is returned to its original position aligned with the Z axis. The momentum vector again circulates about point 31. Now, however, the new trajectory C has a smaller radius than the original trajectory A. The reduction in the radius is equal to twice the distance between points 31 and 35. This reduction in radius is proportional to the reduction in the nutation angle.

In the implementation described above, nutation damping is achieved by moving the pivot back and forth through a fixed number of steps (N). Using a large value for N produces rapid nutation damping, but the nutation angle cannot be reduced to as small a value as can be achieved if N is small. On the other hand, although a small value of N enables damping to very small nutation angles, the damping rate is much slower. An alternative to using a fixed value for N is to use logic that selects N to be proportional to the nutation angle; namely, proportional to the peak Y axis angular rate. This approach rapidly damps large nutation angles and also reduces nutation to a very small angle.

FIG. 3 illustrates for one implementation of the invention a flow chart of the operation of the microprocessor 26 of FIG. 1. The first decision, represented by block 41, is if the damper is enabled. If it is disabled, that ends the program. If it is enabled, it then looks to see if the magnitude of the Y axis rate, $\omega_y$, sensed by the gyro exceeds the threshold, $\epsilon$. This is represented by decision block 43. If it is below the threshold, then the logic restarts and the stepper motor 27 remains off. If $\omega_y$ exceeds the threshold, as represented by "yes", then the value of K is determined according to $-N$ sign $(\omega_y)$. That is, the magnitude of K is set equal to N (an integer) and the sign of K is opposite to the sign of $\omega_y$. When the y axis rate changes sign, the stepper motor pivots the wheel $+K$ steps from the Z axis. After a delay of T seconds (equal to half the nutation period), represented by block 49, the stepper motor pivots the wheel $-K$ steps to return the wheel axis to its original alignment with the Z axis. The system repeats the above sequence of events until the nutation angle has been reduced sufficiently so that $\omega_y$ remains within the threshold.

Figure 4:
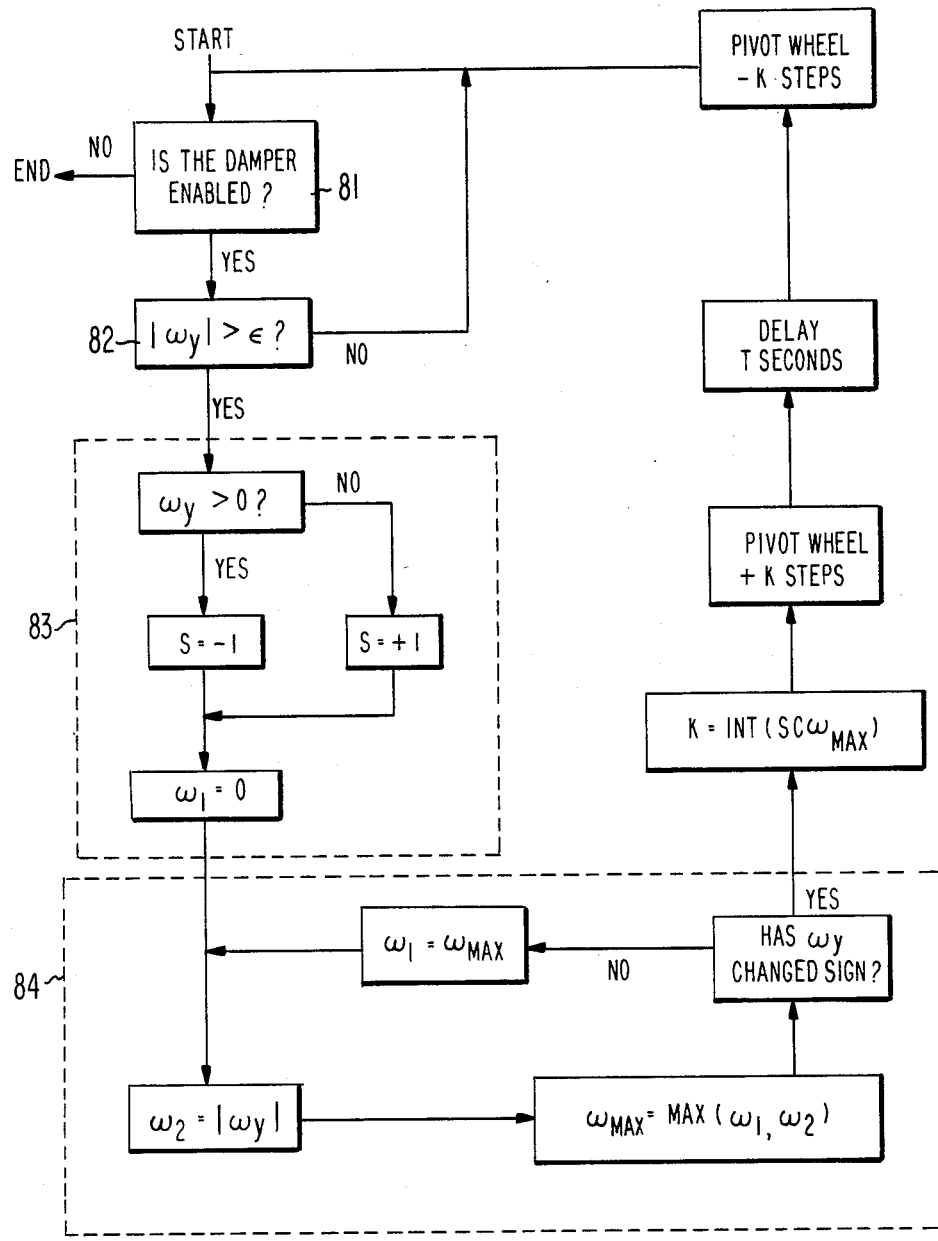
FIG. 4 is a logic diagram for the microprocessor of the damper in FIG. 1 according to a preferred embodiment.

FIG. 4 illustrates an alternative flow chart for the microprocessor 26 of FIG. 1 according to a preferred embodiment. This flow chart is for an implementation in which the number of pivot steps is selected to be proportional to the nutation angle. At the first decision block 81 the microprocessor determines whether the damper is enabled. If it is disable, processing ends. If it is enabled, the processor then determines whether the magnitude of the Y axis rate, $\omega_y$, exceeds the threshold, $\epsilon$. This is represented by decision block 82. If $\omega_y$ is below the threshold, the logic restarts. Otherwise, as shown in dotted block 83, the microprocessor sets parameter S equal to $-1$ if $\omega_y$ is positive and equal to $+1$ if it is not. The microprocessor also sets parameter $\omega_1$ equal to zero.

Dotted block 84 in FIG. 4 contains logic that determines the maximum magnitude of $\omega_y$. The logic in block 84 is executed repeatedly until $\omega_y$ changes sign. Once that happens, K is set equal to the integer nearest $\omega_{max}$ (the maximum magnitude of $\omega_y$) multiplied by a proportionality constant or gain, C, and the sign parameter S. The stepper motor then pivots the wheel $+K$ steps, and after a delay of T seconds (equal to half the nutation period), pivots the wheel $-K$ steps to return it to its original alignment with the Z axis. The system repeats this sequence of events until the nutation angle has been reduced sufficiently so that $\omega_y$ remains within the threshold.

The implementations described above use a rate gyro mounted with its sense axis parallel to the spacecraft's Y axis. This, however, is not a requirement. Any other sensor that provides the proper timing information may be used. For example, an earth sensor, a sun sensor, an accelerometer, etc. may be used. Furthermore, the signal from the sensor does not have to be in phase with the Y axis angular rate. As long as the phase angle is known, an appropriate delay can be inserted into the logic so that the wheel is pivoted at the appropriate point during the nutation cycle. The momentum wheel axis need not be aligned in its initial state with the Z axis. It may instead be parallel and offset, and it may have an angular offset.

Figure 5:
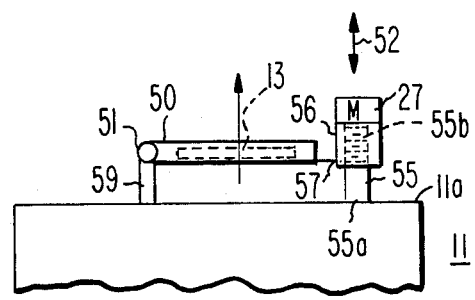
FIG. 5 is a sketch of a mechanical linkage for the pivot motor according to one embodiment of the present invention.

FIG. 5 illustrates an implementation of the mechanical drive represented by dashed lines 19. The momentum wheel 13 may be rotatably mounted in a frame member 50 which is hinged by hinge 51 to a post 59 extending from the top of panel 11a on the satellite platform 11. The hinge 51 extends parallel to the Y axis, and the spin axis of the momentum wheel 13 is parallel to the Z axis in its centered position. The stepper drive motor 27 pivots the frame 50 and wheel 13 vertically as indicated by arrows 52 to provide pivoting under the control of a stepper motor. The stepper motor drives a screw 55 that is fixed to the top panel 11a of the platform 11 at end 55a. The opposite end 55b is coupled to the motor. The screw mates with a threaded collar 56 that is fitted to the frame 50 at point 57 directly opposite the hinge 51. As the stepper motor rotates the screw, the collar moves up and down in the direction of arrows 52 and tilts the wheel 13 and frame 50 about hinge 51.

Figure 6:
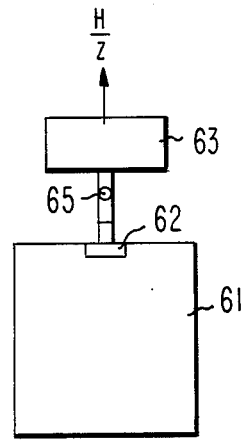
FIG. 6 illustrates the system used in a spinner type satellite configuration.

While the specific embodiment described is related to a three axis momentum-biased satellite with a momentum wheel, the system is equally applicable to other dual-spin type satellites sometimes referred to as "spinners". As shown in FIG. 6, a "spinner" has a large rotor 61 performing the same function as the momentum wheel with a motor 62 coupling the rotor 61 and the despun platform 63. Nutation damping can be provided by pivoting either the platform or the rotor off the nominal angular momentum axis or Z axis by tilting the platform about a hinge along the Y axis (in and out of the paper through point 65). A motor coupled between bodies 61 and 63 may be provided to tilt the axis of the rotor 61 relative to the Z axis or relative to platform 63 and back again in accordance with the principles taught in this application to provide nutation damping.

What is claimed is:

1. An active nutation damping system for a dual-spin spacecraft comprising:
    a spinning body pivotally mounted in a given plane to a platform body with said spinning body pivoted about a pivot axis extending orthogonal to the angular momentum axis of the spacecraft;
    means for sensing motion of the platform body in inertial space about an axis transverse to the spin axis of the spinning body for providing control signals; and
    drive means coupled between said spinning body and said platform body and responsive to said control signals for pivoting said spinning body about said pivot axis relative to said platform body a given amount in one direction, and a half nutrition period later pivoting said spinning body said same given amount in the opposite direction to return the spinning body to its original position to produce a reaction moment on the platform body to counter nutational motion thereby providing nutation damping.

2. The combination of claim 1 wherein said drive means includes a stepper motor and motor control means and said drive means pivots said spinning body about said pivot axis a given amount of steps in one direction and half a nutation period later steps said same number of steps in the opposite direction.

3. The combination of claim 1 wherein said means for sensing motion for providing said control signals includes a threshold means for providing pivot control signals when the nutational errors exceed a given threshold.

4. The combination of claim 1 wherein said sensing means is along the pivot axis.

5. The combination of claim 2 wherein said drive means includes means responsive to said control signals for driving said stepper motor a predetermined number of steps, where said number is dependent on the magnitude of the sensed motion.

6. An active nutation damping system for a dual-spin spacecraft comprising:
- a spinning body pivotally mounted to a platform body in a given plane about a pivot axis where said pivot axis extends orthogonal to the angular momentum axis of the spacecraft;
- means for directly sensing motion of the platform body in inertial space about an axis transverse to the angular momentum axis for providing a first control signal representing angular rate of the platform body about said transverse axis and for providing a second control signal representing the maximum nutation angle;
- drive means coupled between said spinning body and said platform body and responsive to said first and second control signals for, when said first control signal crosses zero, driving said motor to pivot the spinning body a given amount proportional to the sensed nutation angle according to said second control signal in said plane in the general direction of the angular momentum vector component that is transverse to the spinning body's spin axis and a half nutation cycle after said zero crossing driving said motor said same amount in the opposite direction to return the spinning body to its initial position to produce rapid nutation damping.

7. The combination of claim 6 wherein said transverse axis is the pivot axis.

8. An active nutation damping system for a dual-spin spacecraft comprising:
- a spinning body pivotally mounted to a platform body in a given plane about a pivot axis where said axis extends orthogonal to the angular momentum axis of the satellite;
- means for directly sensing motion of the platform body in inertial space about an axis transverse to the angular momentum axis for providing a first control signal representing angular rate of the platform body about said transverse axis and for providing a second control signal representing the maximum nutation angle;
- drive means including a stepper motor and motor control means coupled between said spinning body and said platform body and responsive to said first and second control signals for, when said first control signal crosses zero, driving said motor to pivot the spinning body a number of steps proportional to the sensed nutation angle according to said second control signal in said plane in the general direction of the angular momentum vector component that is transverse to the spinning body's spin axis and a half nutation cycle after said zero crossing driving said motor said same amount in the opposite direction to return the spinning body to its initial position to produce rapid nutation damping.

* * * * *

UNITED STATES PATENT AND TRADEMARK OFFICE
CERTIFICATE OF CORRECTION

PATENT NO. : 4,728,062

DATED : March 1, 1988

INVENTOR(S) : Carl H. Hubert

It is certified that error appears in the above-identified patent and that said Letters Patent is hereby corrected as shown below:

Column 4, line 9, " Y' " should be -- +Y' --.

Column 6, line 45, "nutrition" should be --nutation--.

Signed and Sealed this

Sixth Day of December, 1988

*Attest:*

DONALD J. QUIGG

*Attesting Officer*  *Commissioner of Patents and Trademarks*